Patented Jan. 11, 1927.

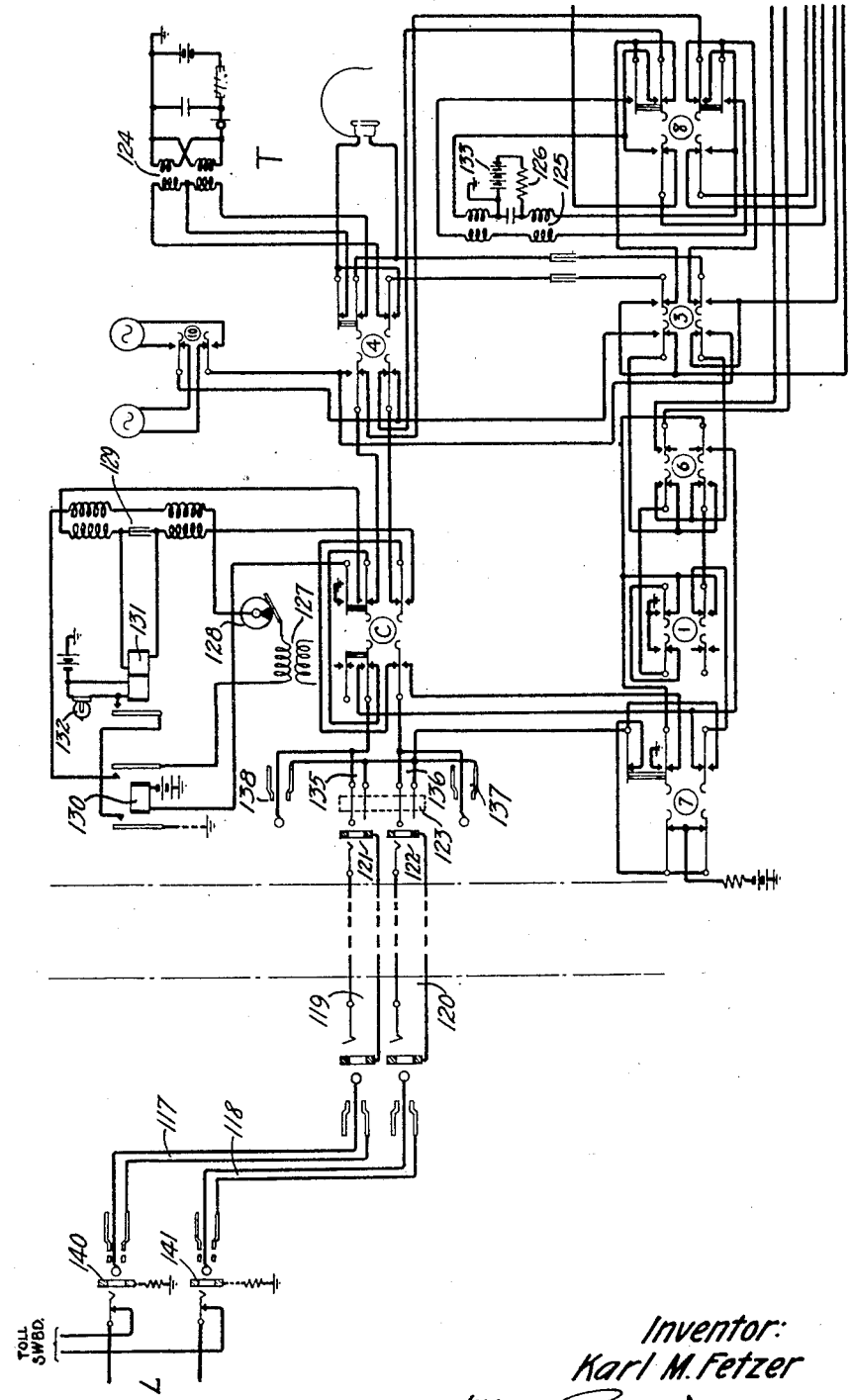

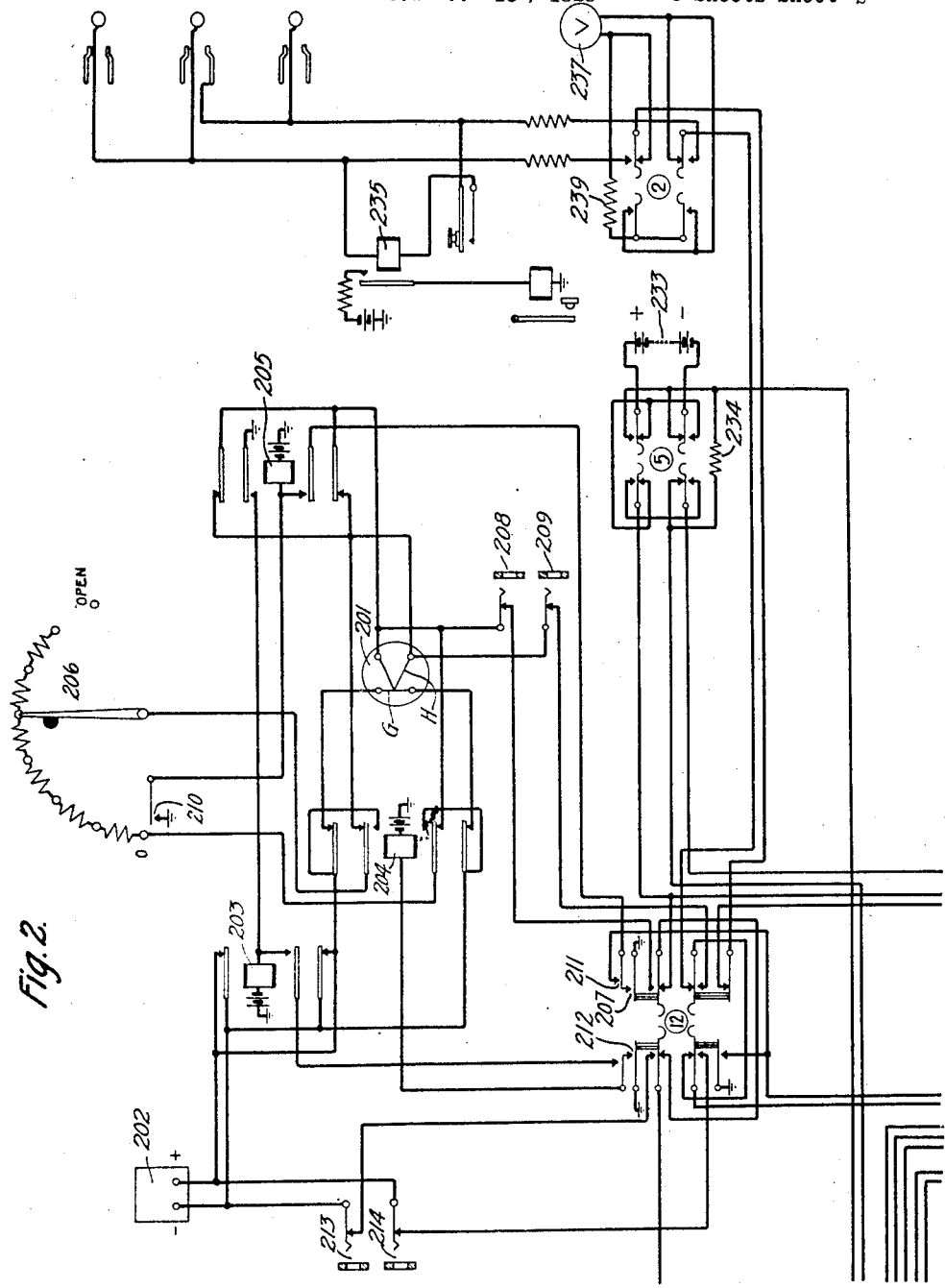

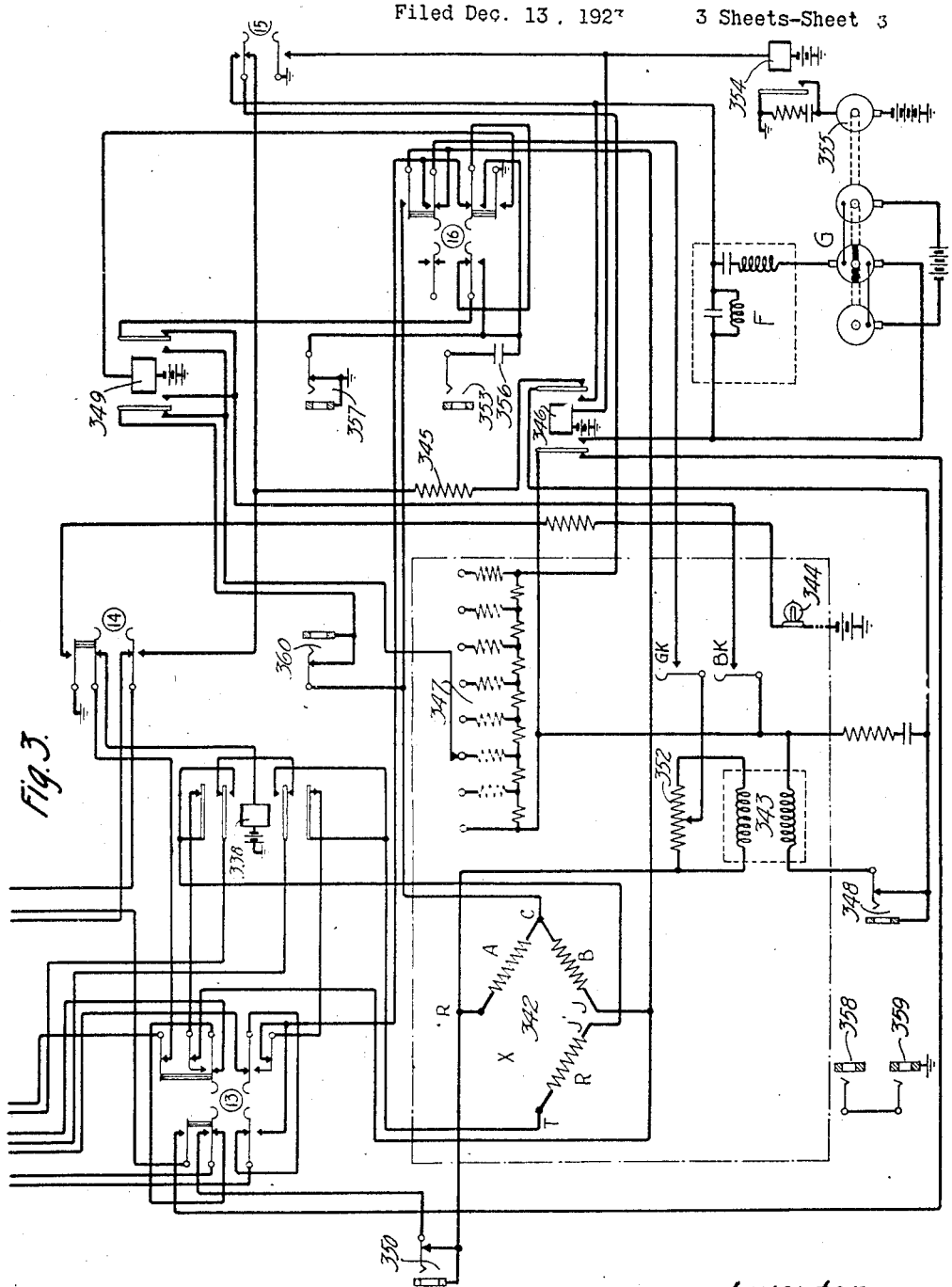

1,613,943

UNITED STATES PATENT OFFICE.

KARL M. FETZER, OF RUTHERFORD, NEW JERSEY, ASSIGNOR TO WESTERN ELECTRIC COMPANY, INCORPORATED, OF NEW YORK, N. Y., A CORPORATION OF NEW YORK.

TESTING SYSTEM.

Application filed December 13, 1923. Serial No. 680,342.

This invention relates to testing systems and more particularly to systems adapted to test for, and locate, faults in telephone and telegraph lines.

Heretofore it has been the practice to provide, at toll exchanges, what are called toll test boards in which all toll lines entering the office terminate and at which board attendants or test men make all required tests on the lines, such as tests for continuity, tests for ground, tests for crosses with other lines, tests for foreign potentials and also resistance measurements, either with a voltmeter where only an approximate result is required or with a Wheatstone bridge where an accurate measurement is essential.

Another function of the test board attendants is "patching" lines, that is, connecting different toll lines together, on the face of the test board, by means of cords and plugs.

At large toll offices in which a great number of lines terminate, toll test boards of upwards of fifty positions, requiring the services of approximately fifty men, are installed, and a large portion of the normal duties of these attendants or test men is the patching of lines while only a very small portion of their time is normally taken up with testing and locating faults, particularly as regards accurate measurements with a Wheatstone bridge; but as the line jacks of the present types of toll test boards are not multipled a complete precision testing circuit including a Wheatstone bridge is installed between every two positions of the test board in order that such tests may be made on any line, when necessary, by the attendant working at the position in which the line terminates.

Due to the fact that the average test board man does not have enough practice in accurately and quickly locating faults to make him proficient, and that a large amount of little used and expensive equipment is tied up in each large toll test board, as before brought out, it has been considered desirable to centralize all the precision testing of a toll office at a single, or at the most, a two-position desk which will be hereinafter referred to as a precision test board where test men skilled in such precision measurements are located thus simplifying the testing equipment at the main test board and relieving the regular test board attendants of this highly specialized work for which they are not, in general, fitted, due to lack of practice as before mentioned. In such an arrangement the line or lines to be tested can be connected at the regular toll test board with the precision test board over special trunk circuits provided for the purpose.

At this precision test board means are also provided including a thermo-couple and a micro-ammeter, for measuring very small foreign currents of either alternating or direct character.

In making such tests, if these sensitive devices were connected directly across the line without regard to the approximate strength of the current to be measured, there would be considerable danger of their being damaged due to the current being too great for the current carrying elements of these devices and therefore means, hereinafter referred to as a feature of the invention, are provided for protecting such sensitive devices until an idea can be gained as to the relative intensity of the current to be measured.

The object of the invention, is therefore, to simplify testing equipment of this character and improve the efficiency of the tests made.

The principal feature of the invention consists in a circuit arrangement for testing systems of the above character whereby, sensitive electrical devices such as microammeters, thermo-couples, etc., are protected from currents greater than they are designed for by maintaining a normal short circuit or low resistance bridge across their terminals and automatically removing this short circuit or bridge when a variable shunt resistance also connected across these terminals has been reduced to zero or to such a low resistance value as to protect the device under the maximum current conditions it is considered necessary to guard against.

After the normal short circuit has been removed, the shunt resistance can be increased to any desired value, even to the extent of opening the shunt entirely.

Other features of the invention will appear hereinafter.

The invention will be more readily understood by reference to the drawings which, when placed together so that Fig. 2 is at the right Fig. 1 and Fig. 3 is below Fig. 2 show a complete testing circuit for making all necessary tests on toll lines.

Fig. 1, when taken separately, shows the cord circuits of the precision test board, the attendant's telephone set, and certain of the equipment at the main toll test board.

Fig. 2 shows a microammeter, a thermocouple, and means for protecting these devices against abnormal currents, also a voltmeter and a Morse relay, and Fig. 3 shows a Wheatstone bridge circuit arranged for making well known tests.

The operation of the circuits of this precision test board is as follows:

Let us assume that toll line L has been reported as in trouble and has been connected through to the precision test board over patching cords 117 and 118 and test trunks 119 and 120, and also that the test man at the precision test board has been notified accordingly, by means not shown.

In taking up the line for test, the test board attendant will insert plug 123 into jacks 121 and 122 of the testing trunks 119 and 120.

With all keys in normal position, the attendant's telephone T will now be connected with the line under test and he can talk with a lineman or a distant operator if desired. This talking circuit can be traced from the upper conductor of the toll line L, over the tip conductors of cord 117 and trunk 119, tip contacts of jack 121 and the upper tip contact of plug 123, normal contacts of keys C, 4, 8, 3 and 4, through the left-hand winding of repeating coil 124, and thence back to the lower conductor of the line L, over keys 4, 3, 8, 4 and C, lower tip contact of plug 123, tip spring of jack 122 and tip conductors of trunk 120 and cord 118.

By throwing keys C and 8 to the left and key 3 to the right, a source of talking battery 133 (48 volts) is connected through a resistance 126 and the right-hand windings of repeating coil 125 to the line under test. This circuit also permits a lineman and the test man to talk with each other, talking battery in this case being supplied to the lineman from the previous test board. If key C is left in normal position, battery can be supplied to the line under test by throwing key 8 to the right. The test man now talks through the repeating coil 125.

With key C normal, ringing current of 20 cycles may be connected to the test cord and thence over the trunks 119 and 120 to the line under test by throwing key 4 to its left position. In case key C is thrown in its left position, ringing current can be connected to the line by throwing key 3 to the left.

To supply 135 cycle ringing current instead of 20 cycle, to either of the above connection, key 10 should be operated.

In case the test man desires to place a holding tone on the line under test in order that the lineman can identify the line and use it to call in over, key C may be thrown to the right whereupon a tone supplied from source 127 and interrupted by interrupter 128 is connected through transformer 129 over the right-hand alternate contacts of key C and the left-hand normal contacts of this key to the tip conductors 136 of the plug 123, and thence to the line L. The above tone circuit is closed by the operation of relay 130, the operating circuit for which is closed at the upper right hand alternate contacts of relay C, which circuit is obvious. The operation of key C to the right also connects the secondary side of the transformer 129 to the tip and ring conductors of the cord. Relay 131 which is connected across a condenser in the secondary winding of transformer 129 is now bridged across the cord and trunk, and will be operated by ringing current coming in over the testing trunks and the cord from the toll line caused, for example, by a lineman ringing on the line with his test set. Relay 131 in operating, locks up in a circuit which may be traced from battery, through the left hand winding and left hand alternate contacts of this relay, and the left hand alternate contacts of relay 130 through auxiliary signals to ground. Under this condition, lamp 132 will be lighted. When the test board attendant answers such a call, he restores key C to normal thereby releasing relays 130 and 131 and extinguishing lamp 132.

*Voltmeter tests.*

The voltage of the test battery 233 can be measured by throwing key 6 to the right which short circuits resistance 234 normally connected in series with the test battery and also short circuits the tip and ring conductors 135 and 136 of the testing cord. The voltmeter 237 is now connected directly across the terminals of the test battery in a circuit which can be traced from the positive terminal of the test battery over the normal contacts of key 5, the normal contacts of keys 12, 8, 13, 3, 6 and 1, alternate contacts of key 6, normal contacts of keys 7, 1, 6, 3, 13 and 8, upper and lower inner normal contacts of relay 338, normal contacts of keys 12 and 2, voltmeter 37, normal contacts of keys 2, 12, 14 and 5, alternate contacts of key 6, and normal contacts of key 5 to the negative terminal of battery 233.

Foreign potentials incoming over the test trunks 119 and 120 can be measured by throwing keys C and 5 to the left which disconnects the test battery 233 and connects the voltmeter 237 directly across the conductors 136 and 135 of the cord in such a manner that the incoming foreign potential will be registered on the voltmeter. Under the conditions existing with keys C and 5 thrown to the left, the positive terminal of the voltmeter 237 will be connected to the ring conductor 135 of the cord. In case the voltmeter should show a backward reading, key 6 may be thrown to the left, thereby reversing the conductors to the voltmeter.

A foreign potential between the tip of the line and ground or between the ring conductor of the line and ground may be measured by throwing key 1 either to the right or the left depending on whether the tip or ring of the line is to be tested to ground, keys C and 5 being thrown to the left as before. Under either of these conditions, the positive terminal of the voltmeter will be connected to the conductor under test and the negative terminal will be connected to ground. In case it is desired to reverse the voltmeter connection, key 6 may be operated to the left as before.

To test for the continuity of the line L under test, the key C is thrown to the left which connects the battery 233, the resistance 234 and the voltmeter 237 in series across the tip and ring of the line. In making this test, if the circuit is open, a momentary deflection of the voltmeter needle will sometimes be obtained, especially if the line under test is a long one and its insulation resistance high.

In testing toll lines that have bridged electromagnetic devices connected across them at the distant end, the presence of this apparatus will be indicated by a steady deflection of the voltmeter as soon as the test key C is thrown. However, if such devices include a series condenser, the voltmeter needle will be deflected only momentarily.

On short lines, the presence of bridged electromagnetic apparatus can always be determined by operating key 6 to the left which will cause the voltmeter to be deflected by the discharge of the condenser at the distant end, the magnitude of the deflection being a rough estimate of the capacity bridged across the line. On long lines having more than one bridge of this sort or on cable circuits, this deflection may be too large to be accurately read on the voltmeter. In such cases, key 2 should be operated to the left, thereby reducing the deflection by shunting resistance 239 across the voltmeter terminals.

The test for grounds on the line L is similar to the test for continuity except that key 1 is also used. With key C thrown to the left, the operation of key 1 to the left opens the tip side 136 of the testing circuit and connects the positive terminal of the battery 233 to ground. The operation of key 1 to the right opens the ring side 135 of the testing circuit and connects the positive terminal of the battery to ground. In either case, the voltmeter reading will be an approximate indication of the resistance of the connected side of the circuit to ground. The line under test must be opened at the distant end to determine by these tests if the ground is on the tip or the ring conductor. The approximate resistance for either of the voltmeter tests hereinbefore described can be readily computed by a well known formula which is based upon the fact that the scale divisions from zero to the needle of the voltmeter represent the resistance of the voltmeter and that the scale divisions from the needle to the battery voltage represent the resistance in series with the voltmeter. This formula is expressed as follows:—

$$X = \frac{rE}{D} - r - r'$$

where:

$X$ = the unknown resistance under test,
$r$ = the resistance of the voltmeter,
$E$ = the test battery voltage measured as before described,
$D$ = the voltmeter reading when in series with the resistance to be measured,
$r'$ = the resistance (234) in series with the testing battery.

In practice, the resistance of the voltmeter used for these tests may be either 100,000 or 1,000 ohms depending on whether the voltmeter is connected in the circuit directly or whether the voltmeter shunt 239 is connected by operating key 2 to the left.

In measuring resistances with the voltmeter, the results are more accurate when the resistance of the voltmeter is nearly equal to the resistance being measured. For this reason key 2 should be operated to the left to connect the shunt 239 across the voltmeter when measuring resistances up to 10,000 ohms. Assuming that the battery 233 stands at 150 volts, if the voltmeter reads in excess of 135 volts, with key 2 in its normal position, the resistance X is about 10,000 ohms or less and the shunt should therefore be used by operating key 2 to the left.

The insulation resistance of the line can be determined either by the continuity test or test for ground previously described, but since the insulation resistance of a line is, in general, much higher than the resistance $r'$ (234) in series with the testing battery which in the assumed case is 500 ohms, this resistance can be disregarded. Further the key 2 should not be thrown to connect the shunt 239 across the voltmeter terminals in order that the resistance of the voltmeter will be as high as possible, that is, as close as possible to the resistance to be measured.

By disregarding the resistance $r'$ (234), the foregoing formula can be expressed as follows:

$$X = \frac{rE}{D} - r = r\left(\frac{E}{D} - 1\right)$$

where:

$X$ = the insulation resistance to be measured.

$E$ = the voltage of the testing battery.

$D$ = the voltmeter reading when the voltmeter is connected in series with the testing battery and the resistance $X$.

$r$ = the resistance of the voltmeter, which in the assumed case is 100,000 ohms.

A cross between the conductors of the line under test can be detected by the low resistance obtained when measuring for insulation resistance. A cross between either wire of a pair and another circuit may be detected, with the distant end open, either by listening in on each wire or by observing the deflection of the voltmeter needle when testing each wire to ground. With the test cord key C thrown to the left, this listening test can be accomplished by throwing key 1 either to the left or to the right, depending on which wire of the circuit is to be listened on, and throwing key 3 to the right. This combination grounds one side of the attendant's telephone set and connects the other side to the line. The presence of a cross is generally indicated by a greater volume of noise on the wire that is crossed.

A cross may be determined by the voltmeter with the key C operated to the left and key 1 thrown either to the left or right depending on which wire of the circuit is being tested, and then by operating key 5 to the right to reverse the current through the voltmeter. Each time the battery is reversed, a momentary deflection of the voltmeter will be obtained. Usually the deflection obtained when the voltmeter is connected to the faulty wire will be greater than the deflection obtained when the voltmeter is connected to the good wire. The sleeve portion of the toll line 140, 141 may be tested by operating key 7 to the right. Under this condition, the positive pole of the test battery 233 is grounded and the negative pole is connected through the resistance 234, and the voltmeter to the sleeve of the circuit under test.

In any of the circuit arrangements for making voltmeter tests before described, a Morse telegraph relay 235 can be substituted for the voltmeter 237 by operating key 2 to the right, whereupon the operation of the relay can be taken as an indication of the condition of the circuit under test.

In any of the circuit arrangements for testing with the voltmeter hereinbefore described, the voltmeter 237 can be used as a milliammeter by throwing key 2 to the left thereby connecting the resistance 234 across the terminals of the voltmeter.

*Wheatstone bridge measurements.*

When it is desired to make tests of a greater accuracy than can be made with a voltmeter, as before described, the Wheatstone bridge circuit is employed.

In general, all bridge measurements are made with keys C, 13 and 14 operated to the left, the operation of the two latter keys connecting the points T and R of the bridge 342 to the tip (136) and ring (135) of the testing cord circuit, which circuit can be traced from the point T of the bridge 342, lower normal contacts of relay 338, right-hand normal contacts and left-hand lower alternate contacts of key 13, normal contacts of keys 3, 6, 1 and 7 and lower alternate contacts of keys C to the tip of the test plug 136 and thence over the line, returning to the ring 135 of the test plug, contacts of keys C, 7, 1, 6 and 3, left-hand inner and upper alternate contacts of key 13 and to point R of the bridge 342 over the normal contacts of jack 350.

The operation of keys 13 and 14 also connect the 150 volt test battery 233 in parallel with the potentiometer 347 and the series combination of the lower or field coil of galvanometer 343 and resistance 345. This circuit can be traced from the positive pole of battery 233, upper normal contacts of key 5, left-hand upper alternate contacts of key 13, and left-hand normal contacts of relay 346 from which point one branch extends through the potentiometer 347, upper normal contacts of key 15, lower alternate contacts of key 14, normal contacts of key 5 and through resistance 355 to the negative pole of battery, the other branch extending through the lower or field winding of galvanometer 343, normal contacts of jack 348, right-hand normal contacts of relay 346, resistance 345 and thence over the previously traced circuit to the negative pole of the battery 233. The operation of key 14 also closes an obvious circuit for the lamp 344 in the galvanometer which is now lighted and reflected in the mirror of the galvanometer onto the scale (not shown). If the reflection of the filament of lamp 344 is not on the zero of the scale, the usual adjustment should be made by the usual means provided for the purpose.

It is assumed that the bridge arms A, B and R of the bridge 342 are variable, in accordance with established practice.

As the present Wheatstone bridge circuit is similar to circuits used for many years and as the various tests made with this bridge, including the well known Varley and Murray tests, are well known in the art and as this bridge circuit and the various tests made therewith form no part of the present invention it is not proposed to describe them further, other than to point out that key BK controls the supply of current from the potentiometer 347 to the points T and C of the bridge and the key GK controls the connection of the galvanometer to the points R and JJ′ of the bridge and that the various well known tests, as before mentioned, are made by varying the resistance of the variable arms A, B and R in the bridge 342, by adjusting the potentiometer 347 and the variable galvanometer shunt 352 and by actuating the keys BK and GK as is well understood to those skilled in the art.

*Alternating current Wheatstone bridge tests.*

It will be noted that the galvanometer 343 can be used for either direct or alternating current measurements, no pole changing device being required when used with alternating current. For the purpose of making capacity tests for locating breaks in the line and also for measuring the capacity of condensers, etc., the present testing circuit is so arranged that, by substituting eight cycle alternating current supplied by the generator G through the filter F, for the 150 volt direct current testing battery 233, for energizing the field winding of the galvanometer and as a source of bridge supply, such tests can be quickly and easily made.

When a break occurs in a line wire or cable conductor and the ends remain insulated from the other wires on ground, a capacity test is the only means of locating the break. This test is made with a standard condenser of known capacity and can be briefly described as follows: To determine the distributed capacity of one wire of the line to ground the single plug 138 associated with the ring conductor of the test cord is plugged into the jack corresponding with the wire to be measured and the other single plug 137 is plugged into the jack 353. Keys C, 13, 14 and 15 are then thrown to the left and key 16 is thrown to the right. The bridge is now connected for the well known Murray test and eight cycle alternating current from the generator G is supplied through the filter F to the field winding of the galvanometer and to the potentiometer 347 by reason of the operation of relay 346, when key 15 was operated. It will be noted that the operation of key 15 also operated relay 354 which closed the circuit for motor 355 to drive the eight cycle generator G.

We now have essentially an arrangement for comparing the capacity between the open wire and ground with the capacity of the standard one microfarad condenser 356. In this arrangement the arm A of the bridge is set at 1000 and the R arm, which is to be varied, form two arms of the Murray connection and the open wire and the grounded condenser 356 form the other two arms. By adjusting the R arm until no current flows through the galvanometer when keys GK and BK are depressed, the resistances in arms A and B are inversely proportional to the capacities of the line and the condenser, which may be expressed as follows:—

$$\frac{A}{R}=\frac{C'}{C_2}$$

where:

$C'$=the capacity in microfarads of the grounded condenser 356, $C_2$=the distributed capacity in microfarads between the open line wire and ground.

A=the 1000 ohms in the A arm of the bridge, and

R=the resistance in the R arm of the bridge.

Since the arm A has been set at 1000 and the standard condenser 356 is one microfarad, the above formula may be simplified as follows:—

$$C_2=\frac{R}{1000}$$

It is, of course, understood by those skilled in the art that for the purpose of locating the break in the line it is necessary to determine or to have previously determined the electrostatic capacity per unit of length of the line under test or of one having similar characteristics.

In case it is desired to measure the mutual capacity of a pair of wires, the same keys are operated and the two plugs 138 and 137 are inserted in the same jacks as in the preceding test and in addition a single conductor patching cord is used to patch between the other trunk jack and jack 357. Under this condition the alternating current supplied to the bridge is disconnected from ground and connected to the point T of the bridge instead, the capacity between the wires of the pair then constituting the X arm of the bridge. The preceding formula also applies in this case wherein $C_2$ is now the mutual capacity of the pair of wires instead of the grounded capacity of one wire.

In case it is desired to measure the capacity of condensers and other apparatus of a similar nature, a two-conductor plug and cord (not shown) is employed, the strands of this cord being connected to the condenser to be tested. In making this test the plug 138 of the testing cord is plugged into the jack 358 and the plug 137 is plugged into the jack 353. The plug end of the two-conductor cord associated with the condenser to be tested is now inserted in jack 359. As in the case of measuring the line capacity, the keys C, 13, 14 and 15 are operated to the left and key 16 is operated to the right thus establishing the Murray bridge connection and connecting eight cycle current to the potentiometer and galvanometer field coil as before described. Measurements are made as in the case before mentioned, the condenser under test being merely substituted for the open wire in the X arm of the bridge.

The R arm of the Wheatstone bridge may be isolated from the other bridge arms and connected in series with the tip and ring conductors of the testing cord circuit by throwing key 13 to the right. With this arm of the bridge connected to the testing cord in the above manner, it can be inserted in an external circuit by throwing key C to the left and inserting the plugs 137 and 138 in any desired jacks.

*Measurement of small currents.*

It is sometimes desired to measure alternating current of the order of one-half milliampere to fifty milliamperes and direct current of the order of from one microampere to fifty milliamperes incoming over the line, or, to measure the current supplied to the Wheatstone bridge while a bridge measurement is in progress and also to measure miscellaneous small external currents. For this purpose a thermo-couple 201 and a micro-ammeter 202 are provided. Either direct or alternating current can be measured by using the thermo-couple and micro-ammeter, together but direct current only can be measured with the micro-ammeter alone.

A variable shunt 206 is also provided and so arranged that upon the operation of key 12 to the left, the shunt is associated with the micro-ammeter and by operating the key 12 to the right it is associated with the thermo-couple.

In accordance with a feature of the invention means including this variable shunt are provided and so arranged that the thermo-couple and micro-ammeter are protected from excessive currents until the test man has an opportunity to determine its approximate strength.

A description of this feature now follows: Let it be assumed that it is desired to measure current flowing in the line L and, therefore, testing cord plug 123 is inserted in jacks 121 and 122, key C is thrown to the left and key 12 thrown to the right. The operation of key 12 connects ground at its contacts 207 to operate relay 338, the circuit for which can be traced from battery, winding of relay 338, inner upper normal contacts of key 14, right-hand uppermost normal contacts of key 13, contacts 211 of key 12 and to ground over contacts 207 of the same key. Relay 338, in operating, connects the R arm of the Wheatstone bridge 342 and the heating element H of the thermo-couple 201 in series across the tip and ring of the line. This circuit can be traced from the ring conductor 135 of the test plug 123, upper alternate contacts of key C, lower normal contacts of keys 7, 1, 6, and 3, left and right inner upper normal contacts of key 13, left-hand lower normal contacts of key 8, lower inner alternate contacts of relay 338, the R arm of bridge 342, upper inner alternate contacts of relay 338, left-hand inner lower normal contacts of key 12, right-hand inner lower alternate contacts of key 12, normal contacts of jack 209, heating element H of the thermo-couple 201, normal contacts of jack 208, right-hand inner upper alternate contacts of key 12, left-hand inner upper normal contacts of key 12, left-hand inner upper normal contacts of key 8, right-hand inner lower normal contacts of key 13, right and left inner lower normal contacts of key 13 and upper normal contacts of keys 3, 6, 1 and 7 and left-hand lower alternate contacts of keys C to tip conductor 136 of the test cord plug 123. The operation of key 12 also disconnected the 150 volt test battery 233 and the volt meter 237. It should be noted however, that at this time, the heating element H of the thermo-couple 201 is short-circuited at the uppermost and lowermost normal contacts of relay 205 thereby preventing any current flow therein which might be high enough to burn it out.

Now, if the contact arm of the rheostat 206 is not in the zero position, it should be turned to this position thereby closing contacts 210 to operate relay 205 in an obvious circuit. Relay 205, in operating, locks up through contacts 207 of key 12 to ground and removes the short circuit around the heating element H of the thermo-couple. Relay 205, in operating, also connects ground at its inner upper alternate contacts for operating relay 203 which relay in operating breaks at its uppermost and lowermost normal contacts a short circuit, which up to this time has existed across the terminals of the microammeter 202.

It will be noted, however, that the heating element H of the thermo-couple 201 is still short-circuited by the contact arm of rheostat 206 while it remains in the zero position, and the next operation, therefore, is to adjust this arm to any desired value of shunt around the thermo-couple heating element. It will be noted that this shunt can be removed entirely by throwing the rheostat arm to the extreme right which is its open position.

It is, of course, understood that variable resistance arm R of the bridge 342 can be regulated as desired to control the current flowing through the thermo-couple heating element.

If direct current of less than one-half milliampere is to be measured, the micro-ammeter 202 can be used alone without the thermo-couple. To establish this connection key 12 is thrown to the left instead of to the right, whereupon relay 338 is operated as before from ground at the left-hand lowermost alternate contacts of key 12, and relay 204 is operated from ground at contacts 212 of this key. The operation of relay 338 in conjunction with key 12 in its left-hand operated position, connects the micro-ammeter 202 and the resistance arm R of bridge 342 in series across the tip and ring of the testing cord. As in the previous case, however, micro-ammeter 202 is short-circuited at the upper and lowermost normal contacts of relay 203. The operation of relay 204 disconnects the rheostat 206 from the thermo-couple 201 and connects it across the terminals of the micro-ammeter 202 and disconnects the G element of the thermo-couple 201 from the micro-ammeter. This circuit can be traced from the zero contact of the rheostat, inner lower alternate contacts of relay 204 to the negative terminal of the micro-ammeter and from the rheostat arm over the upper inner alternate contacts of relay 204 to the positive terminal of the micro-ammeter. The short circuit across the terminals of the micro-ammeter is removed as before by the operation of relay 203 which is controlled by relay 205, which in turn is operated when the rheostat arm is rotated into its zero position thus closing contacts 210. Relay 203, in operating, locks up to ground over its inner lower alternate contacts and the left-hand uppermost alternate contacts of key 12. As in the case of the thermo-couple, the micro-ammeter is now short circuited by the rheostat arm until the test man adjusts the resistance of the shunt across the micro-ammeter to the desired value.

In case it is desired to measure alternating currents supplied to the Wheatstone bridge while a bridge measurement is in progress, it is necessary to use a patching cord, not shown, one end of which is equipped with two single conductor plugs and the other end with a double conductor plug.

With the connections set up for any of the previously described Wheatstone bridge tests, the double conductor plug of the patching cord is inserted in jack 360 and the two single conductor plugs are inserted in jacks 208 and 209. Then if key 12 is thrown to the right and the arm of rheostat 206 is rotated to the zero position, relays 205 and 203 operate in succession to remove the shunt around the thermo-couple 201 and the micro-ammeter 202 as previously described. The current supplied to the Wheatstone bridge at points C now flows through the parallel paths formed by the heating element H of the thermo-couple 201 and whatever resistance is in the rheostat 206 and a reading of the total current will be indicated on the micro-ammeter 202, the micro-ammeter being calibrated for each value of resistance in the rheostat.

In case it is desired to determine the current in the X-arm of the bridge, the same connections are set up except that the two conductor plug of the patching cord is inserted in jack 350 instead of in jack 360.

In case it is desired to read direct current supplied to the bridge or in the X-arm of the bridge, if this current is less than one-half milliamperes, the micro-ammeter can be used alone as before described. To establish this connection, key 12 is thrown to the left instead of to the right, the plug 123 is inserted in jacks 213 and 214 instead of in jacks 208 and 209, and the two conductor plug of the before mentioned patching cord inserted in either jack 360 or 350 depending upon whether the current supplied to the bridge or in the X-arm is to be measured.

It will be observed from the foregoing that the micro-ammeter and thermo-couple are protected from excessive currents by means of a short-circuit across their terminals which is only removed when the contact arm of the rheostat is moved into its zero position, thereupon removing the first short circuits and substituting another which includes the contact arm and zero terminal of the rheostat.

The test man now, therefore, has control of the amount of current which passes through these devices and can adjust the contact arm as desired, even to the extent of throwing it to the "open" position, thereby removing the shunt entirely in case the micro-ammeter indicates that the full current in the line is not great enough to damage either device.

What is claimed is:

1. An electrical device, means for short circuiting said device, a variable resistance shunt circuit adapted to be associated therewith, and means operated in response to reduction of the resistance in said shunt circuit to a minimum value for removing said short circuit and for substituting said shunt circuit.

2. In combination, an electromagnetic relay, a sensitive electrical device, a variable resistance in shunt to the terminals thereof, said variable resistance including a movable contact, another low resistance shunt circuit for said device completed by the normal contacts of said electromagnetic relay, and a circuit for said relay completed when said movable contact is in a predetermined position, whereby said low resistance shunt circuit is interrupted.

3. In combination, a device for measuring electrical current flow, a short circuit being normally connected across the terminals of said device, means for opening the said short circuit, a rheostat having a movable contact adapted to be associated with said device, and means including the movable contact of said rheostat for actuating said first means and for operatively associating said rheostat with said device.

In witness whereof, I hereunto subscribe my name this 11 day of December A. D. 1923.

KARL M. FETZER.